May 16, 1967        G. R. PITTMAN        3,319,537

PISTON FOR PNEUMATIC CYLINDERS

Filed Nov. 8, 1965

INVENTOR.
GLEN R. PITTMAN
BY
Gardner & Zimmerman
ATTORNEYS

United States Patent Office 3,319,537
Patented May 16, 1967

3,319,537
PISTON FOR PNEUMATIC CYLINDERS
Glen R. Pittman, San Leandro, Calif., assignor to Flair-Line, San Leandro, Calif., a corporation of California
Filed Nov. 8, 1965, Ser. No. 506,735
5 Claims. (Cl. 92—242)

This invention relates to pistons for use in pneumatic cylinders, and is particularly directed to an improved piston that is arranged to reduce friction while absorbing all side thrust loading and to provide support to the leading-sealing lip of the piston to prevent undesirable folding thereof.

Spool shaped molded, one-piece, rubber-and-metal pistons are commonly employed in a variety of pneumatic cylinders, particularly those of the double-acting type. Such pistons include a central metal washer to facilitate rigid connection to a piston rod, and a cylindrical molded rubber body bonded to the washer. The periphery of the body is inwardly tapered from its opposite ends to a central surface of reduced diameter, and the opposite ends are inwardly dished. Thus, sealing edges or lips are peripherally defined at the opposite ends of the piston body. Pistons of this type have the advantage of reduced contact with the cylinder wall, contact only occurring at the end lips to provide sealing, since the inwardly tapered peripheral region of the piston between the lips does not contact the cylinder wall, friction is significantly minimized. However, the lips of the above-noted pistons are quite pliable and during piston movement the leading lip tends to fold under due to back pressure. This results in jerky movement of the piston which is undesirable in controlled speed applications.

It is therefore an object of the present invention to provide an improved piston of the general type discussed above having means for supporting the leading sealing edge or lip during piston movement to prevent folding thereof.

Another object of the invention is the provision of a piston of the class described having a positive bearing surface to absorb all side thrust load without metal contact and with minimized friction.

It is a further object of the invention to provide a piston of the class described which is arranged to prevent leakage through the piston in the region of its connection to the piston rod.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Figure 1:
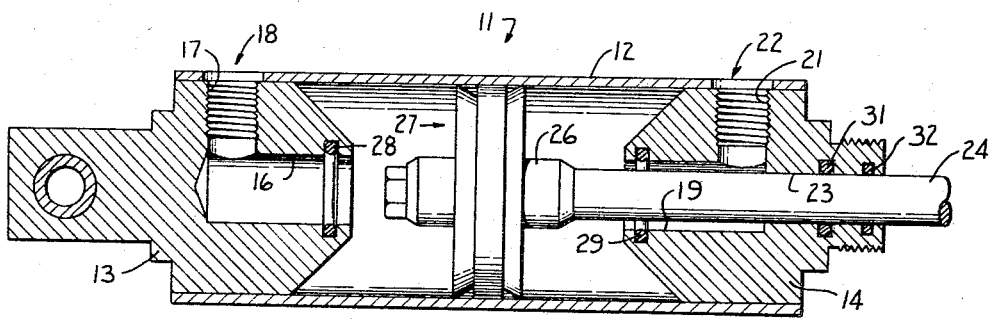
FIGURE 1 is a sectional view taken at a diametric plane through a pneumatic cylinder embodying a piston in accordance with the present invention.
Figure 2:
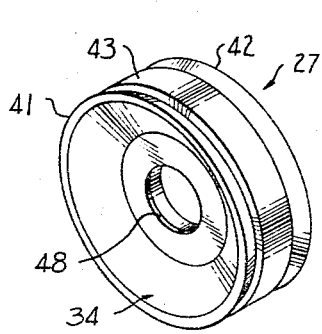
FIGURE 2 is a perspective view of the piston.

Referring now to FIGURE 1, there is illustrated a pneumatic cylinder 11 which is of generally conventional design. The cylinder includes a cylindrical body 12 in the opposite ends of which are sealably secured cylindrical closure plugs 13, 14. Plug 13 is provided with a cylindrical recess 16 extendng coaxially into the inner end thereof. The internal end of the recess communicates with an internally threaded radial passage 17 extending also through the wall of the cylindrical body so as to define a port 18 for the admission or exhaustion of air to or from the body interior. The plug 14 is similarly provided with a cylindrical recess 19 extending coaxially into its inner end and internally communicating with an internally threaded radial passage 21 which also extends through the wall of the body 12. Passage 21 defines a second port 22 for the admission or exhaustion of air to or from the interior of the body. Recess 19 also terminates in an inwardly stepped reduced diameter bore 23 extending through the remainder of the plug 14 to permit traversal by a piston rod 24.

The inner end of the piston rod 24 is formed with an enlarged cushion spud 26, and a piston 27, in accordance with the present invention, is mounted centrally thereof. The piston slidably and sealably engages the internal wall of the cylindrical body 12. The ends of the spud on opposite sides of the piston are respectively receivable in the recesses 16, 19. Seal rings 28, 29 are mounted within the recesses so as to provide seals when the opposite ends of the spud extend thereinto. Seal rings 31, 32 are provided in bore 23 so as to sealably engage the piston rod during movement thereof.

It will be appreciated that the operation of the pneumatic cylinder 11 outlined above is conventional. When air is admitted to port 18 while air is exhausted from port 22, the piston 27, and therefore the piston rod 24 are moved toward the right, as viewed in FIGURE 1. The spud 26 enters the recess 19 to thereby limit the passage of air to port 22 for exhaustion and cushion the end of the stroke of the piston. Conversely, the admission of air to port 22 and exhaustion of air from port 18 effect movement of the piston towards the left. Cushioning of the end of the stroke is provided by the spud entering the recess 16 and limiting the flow of air to port 18 for exhaustion.

Figure 3:
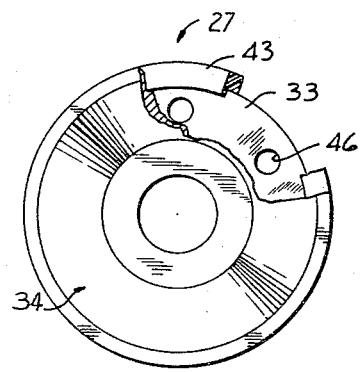
FIGURE 3 is an end view of the piston with portions broken away.

The piston 27 is of the type that includes a central circular rigid washer 33 (see FIGURE 3) to facilitate rigid connection to the piston rod 24. A cylindrical molded body 34 of rubber, or equivalent material, is bonded to the washer, and the periphery of the piston body is inwardly tapered from its opposite ends as indicated at 36, 37. The opposite ends of the body are inwardly dished, as indicated at 38, 39 (see FIGURE 4), such that sealing edges or lips 41, 42 are peripherally defined thereat. With previous pistons of this type contact between the piston and cylinder wall has existed only at the lips 41, 42, the tapered regions 36, 37 being recessed from the cylinder wall. As noted previously, with conventional pistons there had been a tendency for the leading lip, for example lip 42, when the piston 27 is moving towards the right (as viewed in FIGURE 1) to fold under and thereby cause the piston to move with a jerky action. This difficulty is overcome with the piston 27 in accordance with the present invention by the incorporation therein of a relatively rigid slip ring 43 of low friction material concentrically about the body 34, centrally of the tapered regions 36, 37. The slip ring is rigidly secured to the washer 33 and provides back up support to the leading one of the lips 41, 42. In addition, the slip ring provides a low friction positive bearing surface which absorbs all side thrust load without metal contact. More particularly, any side thrust is transmitted from the washer directly into the slip ring, which in turn dissipates the thrust in its low friction engagement with the cylinder wall.

Figure 4:
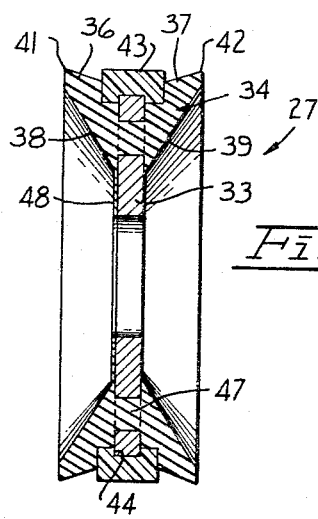
FIGURE 4 is a sectional view taken at a diametric plane through the piston.

Considering now the piston 27 in greater detail as to preferred structure, it will be noted that the inner periphery of the slip ring 43 is preferably provided with a groove 44 which concentrically receives the periphery of the washer 33 in rigid connection. The molded rubber body 34 oppositely extends longitudinally from the end faces of both the washer and the slip ring 43, as best shown in FIGURE 4. Moreover, the washer is preferably provided with a plurality of circumferentially spaced apertures 46 through which longitudinal portions 47 of the body extend to integrally interconnect the portions of the body on opposite sides of the washer and slip ring and thereby bond the overall piston assembly together. The body also preferably covers at least one end face of the washer, as indicated at 48, in order to provide a sealing surface for engaging the spud 26. In this manner, leakage between the opposite sides of the piston through the region of its connection to the piston rod is prevented.

Suitable materials of construction for the piston include steel for the washer 33, urethane, buna rubber, or the like for the molded body 34, and "Nylatron," "Zytel," "Teflon," or equivalent low friction rigid plastic for the slip ring 43.

What is claimed is:

1. A pneumatic piston comprising a rigid washer, a cylindrical rubber body bonded concentrically to said washer, said body having peripheral portions inwardly tapered from its opposite ends and having inwardly dished ends to peripherally define seal lips at the opposite ends of the body, and a slip ring of rigid low friction plastic material concentrically rigidly secured about said washer intermediate said lips.

2. A pneumatic piston according to claim 1, further defined by said washer having a plurality of circumferentially spaced apertures, said body having longitudinal portions extending through said apertures and interconnecting portions of said body on opposite sides of said washer and slip ring.

3. A pneumatic piston according to claim 1, further defined by said body covering at least one end face of said washer.

4. A pneumatic cylinder comprising a hollow cylindrical body having closure members in the opposite ends thereof, said closure members having cylindrical recesses extending coaxially into the inner ends thereof and communicating with radial exteriorly extending port defining passages, one of said closure members having an inwardly stepped reduced bore coaxially extending exteriorly from the recess therein, a piston rod extending through said bore and having an enlarged spud at its inner end, said spud receivable in said recesses, a washer coaxially rigidly secured centrally to said spud, a slip ring of rigid low friction plastic conecentrically rigidly secured about said washer, and a molded cylindrical rubber piston body bonded to said washer in coaxial relation thereto, said piston body having end portions extending coaxially from the opposite end faces of said washer and slip ring, said end portions having peripheries inwardly tapered from the opposite ends of said piston body and inwardly dished end faces to peripherally define seal lips at the opposite ends of said piston body on opposite sides of said slip ring in engagement with the interior wall of said cylindrical body.

5. A pneumatic cylinder according to claim 4, further defined by said washer having a plurality of circumferentially spaced apertures, and said piston body having longitudinal portions extending through said apertures interconnecting said end portions of said piston body.

References Cited by the Examiner

UNITED STATES PATENTS

| | | | |
|---|---|---|---|
| 1,577,732 | 3/1926 | Lamb | 92—243 X |
| 2,309,446 | 1/1943 | Ekkebus | 92—243 X |
| 2,364,823 | 12/1944 | Schnell | 92—243 X |
| 2,984,529 | 5/1961 | Dailey | 92—85 X |

EDGAR W. GOEGHEGAN, *Primary Examiner.*